United States Patent
Lehman et al.

(10) Patent No.: US 7,440,809 B2
(45) Date of Patent: Oct. 21, 2008

(54) HTML DRIVEN EMBEDDED CONTROLLER

(75) Inventors: Delmar Eugene Lehman, Chambersburg, PA (US); Dennis R. Thrush, Chambersburg, PA (US)

(73) Assignee: York International Corporation, York, PA (US)

( * ) Notice: Subject to any disclaimer, the term of this patent is extended or adjusted under 35 U.S.C. 154(b) by 489 days.

(21) Appl. No.: 11/179,315

(22) Filed: Jul. 12, 2005

(65) Prior Publication Data

US 2006/0015195 A1 Jan. 19, 2006

Related U.S. Application Data

(60) Provisional application No. 60/587,920, filed on Jul. 14, 2004.

(51) Int. Cl.
*G05B 15/00* (2006.01)
*G06F 19/00* (2006.01)
*G05D 3/12* (2006.01)

(52) U.S. Cl. .................... 700/83; 700/180; 700/286

(58) Field of Classification Search ............ 700/83, 700/108, 286
See application file for complete search history.

(56) References Cited

U.S. PATENT DOCUMENTS

| | | | |
|---|---|---|---|
| 5,463,555 A | 10/1995 | Ward et al. | |
| 5,611,059 A | 3/1997 | Benton et al. | |
| 5,805,442 A | 9/1998 | Crater et al. | |
| 5,835,712 A | 11/1998 | DuFresne | |
| 5,975,737 A | 11/1999 | Crater et al. | |
| 5,982,362 A | 11/1999 | Crater et al. | |
| 6,026,352 A | 2/2000 | Burns et al. | |
| 6,038,486 A | 3/2000 | Saitoh et al. | |
| 6,061,603 A | 5/2000 | Papadopoulos et al. | |
| 6,201,996 B1 | 3/2001 | Crater et al. | |
| 6,240,326 B1 * | 5/2001 | Gloudeman et al. | ........... 700/83 |
| 6,282,454 B1 | 8/2001 | Papadopoulos et al. | |
| 6,353,853 B1 | 3/2002 | Gravlin | |
| 6,370,582 B1 | 4/2002 | Lim et al. | |
| 6,564,128 B2 | 5/2003 | Baird et al. | |
| 6,580,950 B1 | 6/2003 | Johnson et al. | |
| 6,624,388 B1 | 9/2003 | Blankenship et al. | |

(Continued)

FOREIGN PATENT DOCUMENTS

WO WO 00/67134 11/2000

(Continued)

OTHER PUBLICATIONS

Allen et al., "Strategic Planning for Energy and the Environment" Winter 2003 Vol. 22, No. 3 p. 1-31.*

(Continued)

*Primary Examiner*—Albert DeCady
*Assistant Examiner*—Thomas H Stevens
(74) *Attorney, Agent, or Firm*—McNees Wallace & Nurick, LLC

(57) ABSTRACT

A method and system is provided for gathering, processing, displaying, and manipulating data from building equipment using a dedicated HTML-driven, non-PLC controller having an integral web server. Authorized users who use microprocessor controlled devices to access the website are provided with displayed equipment data that can be selected, monitored, and adjusted based on a user profile controlled by software of the controller.

20 Claims, 3 Drawing Sheets

U.S. PATENT DOCUMENTS

| | | |
|---|---|---|
| 6,636,891 B1 | 10/2003 | LeClair et al. |
| 6,640,140 B1 | 10/2003 | Lindner et al. |
| 6,652,378 B2 | 11/2003 | Cannon et al. |
| 6,842,668 B2 * | 1/2005 | Carson et al. ............... 700/286 |
| 6,889,173 B2 * | 5/2005 | Singh ......................... 702/188 |
| 2001/0048376 A1 | 12/2001 | Maeda et al. |
| 2003/0098798 A1 | 5/2003 | Kato |
| 2003/0105601 A1 | 6/2003 | Kobayashi et al. |
| 2003/0233432 A1 | 12/2003 | Davis et al. |
| 2004/0006401 A1 | 1/2004 | Yamada et al. |
| 2004/0049557 A1 | 3/2004 | Chambers, II et al. |
| 2004/0068749 A1 | 4/2004 | Crater et al. |

FOREIGN PATENT DOCUMENTS

| | | |
|---|---|---|
| WO | WO 01/80494 A1 | 10/2001 |
| WO | WO 03/084183 A1 | 10/2003 |

OTHER PUBLICATIONS

Huang et al., "Using Genetic Algorithms to Optimize Controller Parameters" 1997 Elsevier Science p. 277-282.*

Lea et al., "An HVAC Fuzzy Logic Zone Control System and Performance Results" 1996 p. 2175-2180.*

* cited by examiner

HTML DRIVEN EMBEDDED CONTROLLER

CROSS-REFERENCE TO RELATED APPLICATIONS

This application claims the benefit of U.S. Provisional Application No. 60/587,920 filed Jul. 14, 2004.

FIELD OF THE INVENTION

The present invention is directed to a system and method for communicating or for the transport of electronic data and information from controlled building equipment to local and remotely located users. More particularly, this invention is directed to a system and method for providing data and information from particular items of controlled building equipment, such as heating ventilation air-conditioning and refrigeration (hereinafter "HVAC&R") equipment, to a user, such as a servicing technician or contractor, using a dedicated Hypertext Markup Language ("HTML") embedded, non-PLC, controller that collects and serves data to a website generated by a web server in the controller. The website can be accessed and reviewed by remotely located users on remotely located devices, and can simultaneously be accessed and displayed by other users, including users accessing a local display preferably located on or in proximity to the controlled equipment. Whether in local or remote access mode, the website allows authorized users to control the equipment, and also to independently control the display of the data from the equipment.

BACKGROUND OF THE INVENTION

Modern buildings include sophisticated HVAC&R systems that control the building's interior environment and/or a system process. For example, the air conditioning component of a building HVAC&R system includes at least one compressor, and often several compressors, that operate in conjunction with condensers, evaporators, fans, and other refrigeration circuit components to dehumidify and cool the air circulating throughout the building's interior. Ordinarily, each item of building equipment includes an electronic control panel that permits an operator to activate, deactivate, or adjust the speed or other operating parameter of the building equipment. The electronic control panel is often mounted directly on the equipment, but may alternatively be placed in proximity to the equipment at a location more easily accessible to the operator.

Increasingly, items of building equipment are being networked through building automation systems ("BAS") to permit monitoring and limited control of the equipment by technicians and operators at on-site locations, such as a control room, that are several feet to several hundred feet away from the operating equipment. This allows operators to obtain data from the equipment and to adjust operating parameters of networked equipment accordingly. One component of such a BAS includes a Programmable Logic Controller ("PLC") that includes a back plane for connecting building equipment control modules to the PLC, and further includes simple "ladder logic" for controlling the modules. Due to their logic structure, PLCs, as opposed to microprocessors, can only handle a very limited number of logic functions, and can only perform a very limited number of calculations or other tasks simultaneously. The priority task of known PLCs is to provide data gathering for monitoring purposes, and known PLC-type controllers inherently require attachment to other items of equipment and to a local computer network in order to function in a BAS. The BAS is in essence an intelligent breaker box that turns equipment on or off at scheduled times and upon the happening of certain events. For example, in the case of a fire, a building fire system component would detect fire and tell the BAS to shut off lights and other building equipment that may encourage the spread of fire. Moreover, PLCs operating in a BAS are required to respond to a large number of systems, and must adhere to inflexible communication protocols by which the connected systems can connect and poll with, as well as different protocols for communicating with and controlling the controlled equipment. These requirements, combined with the limited logic capability and slow processing speed of known PLCs, make PLCs a poor choice for flexible and intelligent control of building equipment.

Accordingly, what is needed is a non-PLC controller having a microprocessor that permits fast and accurate gathering, processing, and storage of data from both standalone and BAS-networked building equipment, and also having an embedded web server that allows a plurality of authorized users, whether local or remote, to simultaneously access and view data, and to adjust operation of the equipment.

Furthermore, in typical known embedded controllers, only about twenty percent (20%) of the software program is dedicated to control of the equipment. The remaining eighty percent (80%) is dedicated to monitoring and permitting interaction with users, such as at a human-machine interface device ("HMI"). Accordingly, what is needed is a controller that separates the program code for monitoring from the program code for equipment control in a manner that is efficient yet invisible to users accessing the controller through a HMI.

SUMMARY OF THE INVENTION

The present invention provides a method of locally and remotely monitoring controlled items of building equipment has the step of providing an item of building equipment to be controlled, the building equipment communicably connected to a dedicated HTML-driven, non-PLC, controller. The controller includes an embedded web server and microprocessor executing a computer program stored in memory. The method also includes the steps of operating the equipment, gathering data using the controller, processing the data in a preselected fashion based upon a user profile, serving the data to a website, accessing the website using a microprocessor-controlled device, and displaying the served data on the microprocessor-controlled device. The method can further include the steps of adjusting the display of served data based upon a user's preferences, the preferences associated with a user profile.

A system is provided for simultaneously locally and remotely monitoring and controlling an item of building equipment via an Internet website served by an HTML controller associated with the controlled equipment. The system includes at least one item of building equipment, an HTML-driven, non-PLC, controller communicably connected to the at least one item of building equipment. The controller has a microprocessor executing a computer program that includes computer instructions to poll the equipment and process and display the collected data in a preselected fashion based upon a user profile. The controller of the system further includes a web server to serve a web page to a wide area network for access by a user through an HMI. The computer program includes instructions to prompt the user to enter a user name and password, to recognize the user name and password and to associate the user name and password with a stored user profile that includes an access level for the recognized user. The software further includes instructions to send the data using the web server to the HMI. The sent data corresponds with the access level of the user, and includes instructions executable by the HMI device to generate a display having predetermined display characteristics associated with the stored user profile.

In another embodiment, a system for remotely monitoring building equipment includes: at least one item of building equipment, a non-PLC controller communicably connected to the at least one item of building equipment to receive data from the building equipment, and an HMI interface in communication with the non-PLC controller. The non-PLC controller includes a web server, a microprocessor and a memory storing a computer program executable by the microprocessor. The computer program includes computer instructions to gather data from the connected building equipment and to capture the data in Common Gateway Interface ("CGI") scripts. CGI is a standard for external gateway programs to interface with information servers such as HTTP servers. The computer program further includes computer instructions to populate the data into tags provided in an HTML web page generated by the web server of the non-PLC controller. The computer program further includes instructions to permit a remote user to log on to the web server using a HMI, to prompt the user to enter a user name and password, to recognize the user name and password, to associate the user name and password with a stored user profile that includes an access level for the user, and to send data using the web server to the HMI. The data sent to the HMI corresponds with the user's access level, and further includes instructions executable by the HMI device to generate a display having predetermined display characteristics associated with the user profile, to allow an authorized user to remotely access preselected data, to allow the authorized user to manipulate the data, and to process the user-manipulated data for return to the controller for return to the controller to modify an operating parameter of the building equipment.

An advantage of the present invention is that a local user such as an on-site technician, as well as remote users such as off-site contractors or other authorized remote users, can access the web site of the controller and be linked with the controlled equipment for gathering and monitoring of data, as well as for control of the displayed parameters such as the language of text, units of measure, and types of data displayed without disrupting the data that may be displayed on devices of other users who are simultaneously accessing the controller.

Another advantage of the present invention is that the use of a website generated by a dedicated HTML-driven controller permits data transfer from particular items of building equipment to remotely located users, without the need for networking the controller or item of controlled equipment to a BAS or other local computer network.

Another advantage of the present invention is that the use of a website generated by a dedicated HTML-driven controller provides a quick and easy way for equipment information to be accessed by both local and remote users.

Yet another advantage of the present invention is that it permits a remotely located contractor to monitor numerous pieces of equipment, including equipment located at different geographical sites, without the need for a dedicated connection to any non-Internet computer network(s) that might otherwise control the building equipment.

Still another advantage of the present invention is that it allows service personnel to troubleshoot equipment problems from remote locations, such as their home or office, by providing access to an Internet website generated by the controller, thus allowing them to see exactly what an on-site operator of the equipment would see on a local display linked to the equipment, allowing less service calls while maintaining adequate equipment and customer service.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The foregoing and other features of the present invention will be more readily apparent from the following detailed description.

Wherever possible, the same reference numbers will be used throughout the drawings to refer to the same or like parts.

DETAILED DESCRIPTION OF THE INVENTION

Figure 1:
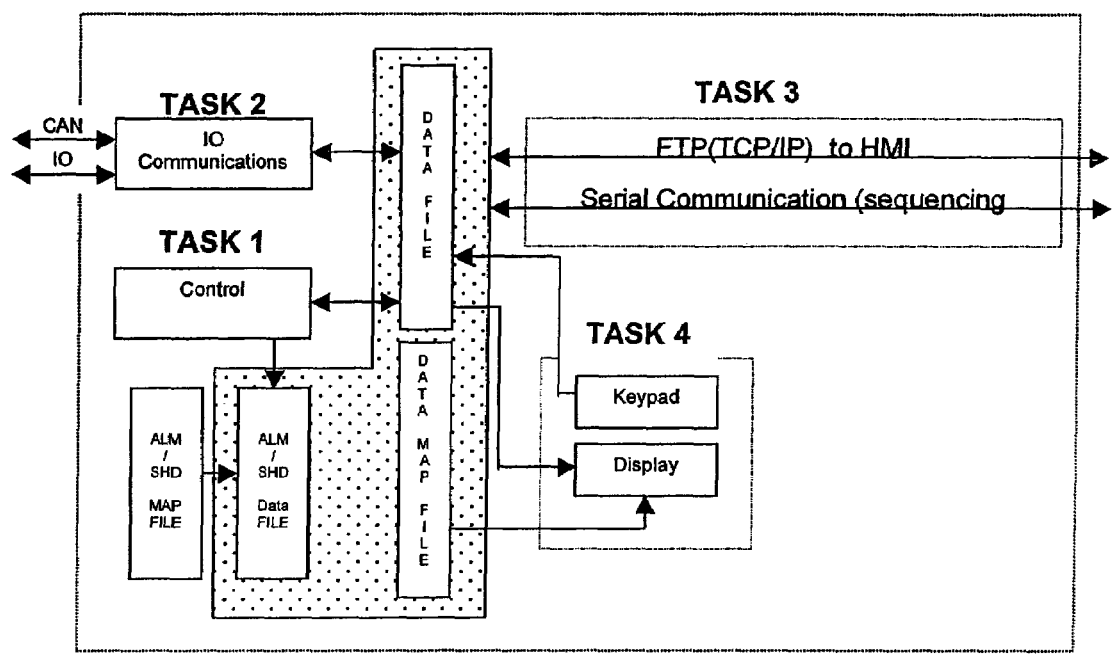
FIG. 1 illustrates a block diagram of one embodiment of a controller system of the present invention.

A system is provided to facilitate monitoring and control of particular items of building equipment, including stand-alone and networked items of equipment (such as in a BAS), by locally and remotely located users, such as on-site technicians and off-site service contractors. The system includes an HTML driven embedded controller for HVAC&R equipment and other building systems, and methods that permit remote access and remote control of the controller and associated equipment through an Internet-based website.

In one embodiment, the controller of the present invention includes a microprocessor (also known as a Central Processing Unit or "CPU") that can generate an interface for a user to control an item of equipment. The interface is presented as a web page that is generated by a web server incorporated in the controller. The web page can be directly viewed on a connected local display screen. Additionally, because the interface is provided as a web page having a unique web site or IP (Internet Protocol) address, the interface can be accessed directly by remote users using virtually any web browser with a connection to the Internet. Access to the website, as well as authorization to monitor and control connected equipment, is controlled by any known means for secure computerized access, such as user lists, passwords, user profiles, and permissions.

The controller interface utilizes HTML and CGI scripts to generate the web page and to populate the web page with relevant data from connected equipment, thereby allowing a live, real-time or near real-time display of data from the controller and connected equipment. Population of the web page with data is achieved by providing HTML tags that are interpreted by CGI scripts that gather, format, and return data to the web server of the controller. The web server provides a web page with the resulting information to the local display screen, as well as to remote devices connected to the web server over the Internet or through serial/USB ports. The generated web pages provide remote users with identical real-time information to that of the local display screen of the equipment, and preferably have the same appearance, layout and operation as the local display screen so that all users feel as though they are standing at the local display screen of the equipment. The result is that local and remote users, such as in various parts of the world, have the ability to gain access to the controller separately or together, yet independently of one another, for the purpose of monitoring, manipulating, servicing, trending, and maintenance of the equipment.

Significantly, the controller of the present invention includes a dedicated microprocessor, rather than a programmable logic controller (PLC) to control connected equipment. The benefit of the microprocessor is that it can multi-task to run control, monitoring, display, and web server functions simultaneously. Moreover, because all of the above functions are performed by the microprocessor of the controller, the controller is not required to be connected to a PLC or Building Automation System (BAS). This is a significant improvement over PLC-type controllers, which inherently require attachment to other items of equipment and to a BAS or other local computer network. Unlike PLC controllers, the controller of the present invention is provided as a dedicated standalone controller that can be accessed and controlled directly either: locally, such as by user input through the connected local display screen; or, remotely, such as by user input through an Internet browser pointed to the website address and web page of the controller. Using either access mode, and depending upon the level of access authority provided to the user in the controller, the user can be provided with direct and full access to the controller, such as to review and make changes to equipment settings, to acknowledge and reset events and alarms, and to perform any other function required to monitor and control the connected equipment.

A significant feature of the controller is its ability to permit individual users to select the display parameters of the displayed data. By way of non-limiting example, through drop-down menus generated and provided by software executed by the microprocessor of the controller, each individual user can select the displayed units of measure, language of text, and other features in a way that is most advantageous for them. For example, the controlled equipment may be physically located in China. When the local Chinese user is having an issue with the equipment, and needs help, he or she calls a service technician, who may be in Denmark. Depending upon the nature of the equipment issue, the Danish service technician may require factory help, and therefore calls the factory in the United States. While the parties are speaking on the telephone, all three parties can access the webpage of the controller simultaneously—the local user through the local display screen, and the Danish and United States users through devices having browsers pointed to the web page of the controller. Each user accesses the webpage and provides a user identifier such as a user name and password. The software of the controller recognizes the user and retrieves a user profile or user access level that includes the user's preferred display parameters. For example, the Chinese user may have a low-level access level that only permits viewing of displayed data, but no control. The Chinese user's profile can further indicate the user's preference to display data in Chinese, using metric units for all displayed measurements. The software of the controller then converts the generated data to meet the Chinese user's profile, and to display the data on the Chinese technician's (local) display in Chinese using metric units for all displayed measurements. By contrast, the Danish user may have a higher access level with edit and control capability that permits the Danish user to remotely control the connected equipment. Additionally, the Danish user's profile requires that the data displayed on the Danish user's remote screen be shown in Danish and in metric units of measure. Lastly, the United States user's access level permits high-level access for such tasks as rewriting and rebooting of software of the controller, and the United States user's profile can be set to require display of all data in English, with English units of measure. In this example, the end result is that the web server of the controller, through the use of CGI scripts, sends HTML web pages, as follows, to the various displays: to the local display with the text in Chinese with pressure units in KPAA and temperature in degrees Celsius ("C"); remotely to the Denmark user with the text in Danish and pressure is BAR and temperature in degrees C.; and finally to the remote United States user with text in English and showing units of PSI and Fahrenheit.

Additional features of the invention are described hereinafter with reference to a first preferred embodiment. In the preferred embodiment, the controller is a controller for a compressor of a refrigeration or HVAC&R system, and the monitored operational parameters of the compressor include: capacity slide position, volume slide position, suction pressure, discharge pressure, oil pressure, main oil injection pressure, economizer pressure, filter pressure, intermediate pressure (at an intermediate stage of compression), balance piston pressure, system discharge pressure, suction temperature, discharge temperature, oil temperature of the compressor, oil separator temperature, process/brine temperature leaving, process/brine temperature entering, motor current, motor amps, motor and compressor speed (RPM), compressor vibration during suction, compressor vibration during discharge, motor vibration at a shaft side, motor vibration at an opposite shaft side, and combinations thereof. However, other parameters of HVAC&R compressors and other equipment can additionally or alternatively be monitored, and the controller of the invention can be used in conjunction with other HVAC&R components and building equipment such as elevators, escalators, fire systems, ingress and egress systems, and the like.

In the preferred embodiment of a controller for an HVAC&R system including a compressor, the controller is part of a control panel including a controller board and a local HMI, and can be configured in any of several ways. Preferably, the controller includes a local HMI having a graphics display, and is located on or in close proximity to each controlled compressor. Alternatively, the configuration can be comprised of several controllers sharing a common local HMI. The controller board's function is primarily to control and maintain the safe operation of the compressor. At the same time, the controller delivers data to the HMI for display, and accepts data input from a user of the HMI for adjustment of HVAC&R system parameters, and for configuration or reconfiguration of the system and all monitored parameters thereof. For example, local display and set point manipulation by a user is provided through the control panel, preferably through input on a keypad and with graphic confirmation and display of adjusted parameters and associated data.

The HMI's primary function is to allow the user to display, monitor and manage data gathered and processed by the microprocessor of the controller. The HMI further provides communication connectivity to the controller and networked equipment, which may include sequencing of multiple controllers (regardless of controller type), as well as displaying data and providing keypad interfaces for local accessibility. The manner in which data is transferred between the HMI and the microprocessor of the controller is exemplary—the information in the controller and the HMI are stored as electronic data files. The communication protocol for passing the data between the controller microprocessor and the HMI is File Transfer Protocol. The File Transfer Protocol (also known as "FTP") is a robust, well tested, industry standard protocol.

Additionally, the common files the controller microprocessor and the HMI share include data and map files.

Controller Overview—The arrangement shown in FIG. 1 shows one proposed software and hardware layout for the controller in an HVAC&R system. As shown in FIG. 1 and described further herein, there are four controller tasks that run independently of each other. The data and map files are loaded into memory connected to the microprocessor of the controller on power up, and are shared between the four tasks. For example, the microprocessor controller will hold data in an integral database that can be accessed and manipulated simultaneously by one or more of a task or user. As data in the system changes, the data and map files may be updated as needed. Security levels in the map file prevent the data file from being modified unless that level of clearance has been authorized.

TASK 1: Control—The Control task of FIG. 1 operates the compressor and includes the safety functions. The control task starts and stops the compressor and maintains the set point of the system. This task also looks at the values in the data file and makes decisions based on the programmed logic. If the conditions of the compressor change, the values in the data file are modified. The Control task is in charge of starting and stopping the compressor in response to instructions obtained manually, automatically, or remotely (from a external device i.e., computer system or distributed control system. The Control task has at least four control modes, with each control mode having a channel selection. The selected channel corresponds to an analog input channel. The analog channel is in turn used to load or unload the compressor and associated equipment in order to maintain the setpoints for preselected parameters such as pressure, temperature, and speed. Each mode is therefore "universal," and the map file or the HMI screen may limit the control mode and set points. A normal operation mode and a scheduling mode can be included in any of the universal modes.

The safety controls are responsible for shutting the compressor down in the event the safety operation of the machine is compromised. The safety controls are responsible for stopping the compressor from loading, force unloading of the compressor, alarming when the compressor is nearing a critical shutdown point, and performing shutdowns when the critical point is passed. These safety controls are preferably made up of stop load points, force unload points, alarm points, and shutdown points. Preferably, there are about 50 safety point sets that can be set and monitored by the controller. The control task will preferably define the majority of the safety point sets based upon specification data received from the connected HVAC&R equipment, although the set points can alternatively be input by the user. Additionally, controller preferably allows a user to manually create, edit, and delete set points. This allows the user to customize the points of safety that they feel are necessary for their application.

An Alarm/Shutdown history file is provided having multiple monitored parameters, and the capability of creating and saving any data that falls outside of preset ranges for those parameters as alarm events. An exemplary listing of alarm events for a controller of the present invention monitoring and controlling an industrial compressor in an HVAC&R system follows:

Analog Board Comm. Fail—Shutdown—The software of the controller is no longer able to communicate to a connected analog board.

Analog Board Fail—Shutdown—The software of the controller is no longer able to communicate to a connected analog board.

Auxiliary alarms—The auxiliary input module has been setup to indicate an alarm when it is de-energized and it became de-energized.

Auxiliary shutdown—The auxiliary input module has been setup to indicate a shutdown when it is de-energized and it became de-energized.

Balance Piston Failure Shutdown—Balance piston control is usually enabled in initial setup. In the preferred embodiment, there are three (3) conditions that will cause a Balance Piston Failure Shutdown/alarm: 1) If the difference between discharge pressure and suction pressure is less than 60 lb. and the balance piston output module is de-energized, then the balance piston pressure must be 1.1 times suction pressure plus or minus 15 lb.; 2) If the difference of discharge pressure and suction pressure is greater than or equal to 60 lb. and the balance piston output module (digital output module 12) is de-energized, then the balance piston pressure must be 50 lb. below discharge pressure plus or minus 15 lb.; 3) If the balance piston output module (digital output module 12) is energized, then balance piston pressure must be within 20 lb. of oil pressure.

Compressor Aux. Failure—This shutdown message is issued if while the compressor is running, the compressor auxiliary input module, which receives feedback from the motor starter, becomes de-energized.

Compressor Interlock Failure—This shutdown message is issued if while the compressor is running the compressor auxiliary input module becomes de-energized for a predetermined time, preferably about 5 seconds.

Compressor Starting Failure—Aux.—This shutdown message is displayed if after about 30 seconds from sending the compressor start command, the compressor auxiliary input module is still not energized.

Compressor Starting Failure—Low Motor Amps—This shutdown message is displayed if after about 30 seconds from sending the compressor start signal, the motor amps reading is not greater than the low motor amps shutdown set point.

Compressor Stopping Failure—Aux.—This shutdown message is issued if while stopping the compressor, after about 5-10 seconds from the compressor stop command, the compressor auxiliary is energized. While this condition is present, the oil pump (if available) is on and liquid injection (if available) is allowed on and the slide valve is unloaded to 0% to safeguard the compressor.

Compressor Stopping Failure—Motor Amps—This shutdown message is issued if while stopping the compressor, after about 10-12 seconds from the compressor stop command the motor current reading is above the low motor amps shutdown set point. While this condition is present, the oil pump (if available) is on, and liquid injection (if available) is allowed on and the slide valve is unloaded to 0% to safeguard the compressor.

Compressor Unable to Unload—Alarm—While stopping the compressor or the compressor is off, the slide valve position has not unloaded below the highest slide valve position to allow starting the compressor set point.

DBS Alarm—The RAM DBS (Digital Bypass Starter) Motor Starter is responding that it has an alarm condition.

DBS Trip—The RAM DBS motor starter is responding that it has a shutdown condition.

Digital Board Reset—Shutdown—If a reset of a digital board occurs, a shutdown will result to prevent the motor from restarting.

Digital Board Comm. Fail—Shutdown—It has been detected that the program is no longer able to communicate to a digital board of the controller.

Discharge End Compressor Vibration Alarm—If a discharge end compressor vibration sensor registers a reading that is higher than the value that has been set for the discharge end compressor vibration alarm, for the period of time as set for the discharge end compressor vibration alarm delay, an alarm will be generated.

Discharge End Compressor Vibration Shutdown—If the discharge end compressor vibration sensor registers a reading that is higher than the value that has been set for the discharge end compressor vibration shutdown, for the period of time as set for the discharge end compressor vibration shutdown delay, a shutdown will be generated.

Discharge Pressure Sensor Fault—This shutdown message is issued if the Discharge Pressure reading was out of range for its sensor.

Discharge Temperature Saturation Alarm—This alarm applies if superheat has been enabled. When running, an alarm will preferably occur if the saturated Discharge Pressure plus set point temperature is greater than the Discharge Temperature for the set point time.

Discharge Temperature Saturation Shutdown—This Shutdown applies if superheat has been enabled. When running, a shutdown will occur if the saturated Discharge Pressure plus set point temperature is greater than the Discharge Temperature for the set point time.

Discharge Temperature Sensor Fault—This shutdown message is issued if the Discharge Temperature reading was out of range for its sensor.

False Start Failure—Aux.—This shutdown message is issued if while the compressor is off the compressor auxiliary is energized. While this condition is present, the oil pump (if available) is on, and liquid (refrigerant) injection (if available) is allowed on and the slide valve is unloaded to 0% to safeguard the compressor.

False Start Failure—Motor Amps—This shutdown message is issued if while the compressor is off, the motor current reading is above the low motor amps shutdown set point. While this condition is present, the oil pump (if available) is on, and liquid injection (if available) is allowed on and the slide valve is unloaded to 0% to safeguard the compressor.

High Auxiliary Analog Alarm—An auxiliary analog value was greater than or equal to the high auxiliary analog alarm set point for its time delay.

High Discharge Temperature Alarm—The Discharge Temperature was greater than or equal to the High Discharge Temperature Alarm set point for its time delay.

High Discharge Temperature Shutdown—The Discharge Temperature was greater than or equal to the High Discharge Temperature Shutdown set point for its time delay.

High Discharge Pressure Alarm—The Discharge Pressure was greater than or equal to the active High Discharge Pressure Alarm set point for its time delay.

High Discharge Pressure Shutdown—The Discharge Pressure was greater than or equal to the active High Discharge Pressure Shutdown set point for its time delay.

High Economizer Alarm—The returned value was greater than or equal to the High Economizer alarm set point for its time delay.

High Economizer Shutdown—The returned value was greater than or equal to the High Economizer Shutdown set point for its time delay.

High Entering Process Temperature Alarm—The Entering Process Temperature was greater than or equal to the High Entering Process Temperature Alarm set point for its time delay.

High Entering Process Temperature Shutdown—The Entering Process Temperature was greater than or equal to the High Entering Process Temperature Shutdown set point for its time delay.

High Liquid Level Shutdown—The corresponding input module was de-energized.

High Manifold Pressure Alarm—This alarm applies if the Engine Drive was enabled. When the Manifold Pressure exceeds this set point, an alarm will occur.

High Manifold Pressure Shutdown—This shutdown applies if the Engine Drive was enabled. When the Manifold Pressure exceeds this set point, a shutdown will occur.

High Motor Current Alarm—The Motor Amps was greater than or equal to the High Motor Amps Alarm set point for its time delay.

High Motor Current Shutdown—The motor amps was greater than or equal to the High Motor Amps Shutdown set point for its time delay.

High Oil Filter Pressure Alarm—The Oil Filter Pressure was greater than or equal to the High Filter Pressure Alarm set point for its time delay.

High Oil Filter Pressure Shutdown—The Oil Filter Pressure was greater than or equal to the High Filter Pressure Shutdown set point for its time delay.

High Oil Temperature Alarm—The Oil Temperature was greater than or equal to the High Oil Temperature Alarm set point for its time delay.

High Oil Temperature Shutdown—The Oil Temperature was greater than or equal to the High Oil Temperature Shutdown set point for its time delay.

High RPM Alarm—This alarm applies if the Engine or Turbine Drive was enabled. If the RPM's of the motor exceeds this set point, an alarm will occur.

High RPM Shutdown—This shutdown applies if the Engine or Turbine Drive was enabled. If the RPM's of the motor exceeds this set point, a shutdown will occur, High Suction Pressure Alarm—The Suction Pressure was greater than or equal to the active High Suction Pressure Alarm set point for its time delay.

High Suction Pressure Shutdown—The Suction Pressure was greater than or equal to the active High Suction Pressure Shutdown set point for its time delay.

Insufficient Main Oil Pressure Shutdown—The Slide Valve is greater than 50% and the Oil Pressure (PSIA) is less than or equal to the Suction Pressure (PSIA) multiplied by 1.5 and then added to 15.0.

Liquid Slug Alarm—This alarm is triggered off of a sudden decrease in Discharge Temperature that is greater than the Liquid Slug Alarm set point for a five (5) second period. That is, if the Discharge Temperature is 130 degrees F., and the Liquid Slug Alarm set point is 10 degrees F., then a sudden drop in Discharge Temperature from 130 to 120 degrees F. within a five second period will generate an alarm condition.

Liquid Slug Shutdown This shutdown is triggered off of a sudden decrease in Discharge Temperature that is greater than the Liquid Slug Shutdown set point for a five (5) second period. That is, if the Discharge Temperature is 130 degrees F., and the Liquid Slug Shutdown set point is 20 degrees F., then a sudden drop in Discharge Temperature from 130 to 110 degrees F. within a five second period will generate a shutdown condition.

Low Auxiliary Analog Alarm—The Auxiliary Analog value was less than or equal to the low Auxiliary Analog #1 alarm set point for its time delay.

Low Auxiliary Analog Shutdown—The Auxiliary Analog value was less than or equal to the low Auxiliary Analog #1 shutdown set point for its time delay.

Low Economizer Alarm—The returned value was less than or equal to the low economizer alarm set point for its time delay.

Low Economizer Shutdown—The returned value was less than or equal to the low economizer shutdown set point for its time delay.

Low Entering Process Temperature Alarm—The Entering Process Temperature was less than or equal to the Low Entering Process Temperature Alarm set point for its time delay.

Low Entering Process Temperature Shutdown—The Entering Process Temperature was less than or equal to the Low Entering Process Temperature Shutdown set point for its time delay.

Low Main Oil Injection Pressure Shutdown—This shutdown can occur if Oil Injection was enabled. The Oil Injection Pressure must be greater than or equal the Suction Pressure times 1.5, plus the set point to be in the safe condition, otherwise this shutdown will occur.

Low Motor Current Shutdown—This shutdown message is issued if, while the compressor was running, the Motor Amps reading was less than or equal to the Low Motor Amps Shutdown set point.

Low Oil Pressure Alarm—The compressor was running. Either the Oil Pressure of a running pump was less than or equal to the Low Oil Pressure Alarm set point, or the Oil Pressure of a not running pump was less than or equal to the Low Oil Pressure Alarm set point for its time delay.

Low Oil Pressure Shutdown—The compressor was running. Either the Oil Pressure of a running pump was less than or equal to the Low Oil Pressure Shutdown set point, or the Oil Pressure of a not running pump was less than or equal to the Low Oil Pressure Shutdown set point for its time delay.

Low Oil Separator Temperature Alarm—The Oil Separator Temperature was less than or equal to the Low Oil Separator Temperature Alarm set point for its time delay.

Low Oil Separator Temperature Shutdown—The Oil Separator Temperature was less than or equal to the Low Oil Separator Temperature Alarm set point for its time delay.

Low Oil Temperature Alarm—The Oil Temperature was less than or equal to the Low Oil Temperature Alarm set point for its time delay.

Low Oil Temperature Shutdown—The Oil Temperature was less than or equal to the Low Oil Temperature Shutdown set point for its time delay.

Low Process Temperature Alarm—Process Temperature was the active Capacity Control and the Process Temperature was less than or equal to the Low Process Temperature Alarm set point for its time delay. This Process Temperature is the Leaving Process Temperature.

Low Process Temperature Shutdown—Process Temperature was the active Capacity Control and the Process Temperature was less than or equal to the Low Process Temperature Shutdown set point for its time delay. This Process Temperature is the Leaving Process Temperature.

Low RPM Alarm—This alarm applies if the Engine or Turbine Drive was enabled. If the RPM's of the motor drops below this set point, an alarm will occur.

Low RPM Shutdown—This shutdown applies if the Engine or Turbine Drive was enabled. If the RPM's of the motor drops below this set point, a shutdown will occur.

Low Suction Pressure Alarm—The Suction Pressure was less than or equal to the active Low Suction Pressure Alarm set point for its time delay.

Low Suction Pressure Shutdown—The Suction Pressure was less than or equal to the active Low Suction Pressure Shutdown set point for its time delay.

Maintenance—Alarm—This alarm is generated from the Maintenance Schedule. It indicates that the amount of hours in the Service Every column has been exceeded. The alarm name may be custom named by the operator. This is purely an informational maintenance alarm, and there is no shutdown associated it.

Missing Oil Pressure Alarm—The Oil Pressure (PSIA) is less than the Suction Pressure (PSIA) multiplied by 1.1 and then added to 15.0, then delayed by 25 sec.

Missing Oil Pressure Shutdown 1—The Oil Pressure (PSIA) is less than the Suction Pressure (PSIA) multiplied by 1.1 and then added to 15.0, then delayed by 2 min.

Missing Oil Pressure Shutdown 2—The Oil Pressure (PSIA) is less than the Suction Pressure (PSIA) added to 15.0, then delayed by 25 sec.

Motor Stator Temp. Alarm—If Motor Stator temperature sensor registers a reading that is higher than the value that has been set for the Motor Stator Temp. Alarm, for the period of time as set for the Motor Stator Temp. Alarm Delay, an alarm will be generated.

Motor Stator #1 Shutdown Alarm—If Motor Stator temperature sensor registers a reading that is higher than the value that has been set for the Motor Stator Temp. Shutdown, for the period of time as set for the Motor Stator Temp. Shutdown Delay, a shutdown will be generated.

Motor Starter Comm. Fail—Shutdown—It has been detected that the program is no longer able to communicate to a RAM DBS Motor Starter.

Oil Level Shutdown—The corresponding input module for low Oil Level was de-energized for five (5) minutes.

Oil Log Shutdown—Oil log was enabled in Factory Setup and the Compressor has not started and the Oil Pump has already run for the fail delay time.

Oil Pressure Sensor Fault—This shutdown message is issued if the Oil Pressure reading was out of range for its sensor.

Oil Pump Aux Failure—While starting the Oil Pump, the Oil Pump Auxiliary input module did not energize within five (5) seconds, or, while the Oil Pump was running, the Oil Pump Auxiliary input module de-energized.

Oil Pump #1 Aux. Alarm—While starting Oil Pump #1, the Oil Pump #1 Auxiliary input module did not energize within five (5) seconds, or, while this Oil Pump was running, the Oil Pump #1 Auxiliary input module de-energized. This indicates Dual Pump Control and Pump #1 is the lead pump.

Oil Pump #1 Aux. Failure Shutdown—While starting Oil Pump #1, the Oil Pump #1 Auxiliary input module did not energize within five (5) seconds, or, while this Oil Pump was running, the Oil Pump #1 Auxiliary input module de-energized. This indicates Dual Pump Control and Pump #1 is the last pump to start.

Oil Pump #2 Aux. Alarm—While starting Oil Pump #2, the Oil Pump #2 Auxiliary input module did not energize within five (5) seconds, or, while this Oil Pump was running the Oil Pump #2 Auxiliary input module de-energized. This indicates Dual Pump Control and Pump #2 is the lead pump.

Oil Pump #2 Aux. Failure Shutdown—While starting Oil Pump #2, the Oil Pump auxiliary input module did not energize within five (5) seconds, or, while the Oil Pump was running, the Oil Pump auxiliary input module de-energized. This indicates Dual Pump Control and Pump #2 is the last pump to start.

Oil Temperature Sensor Fault—This shutdown message is issued if the Oil Temperature reading was out of range for its sensor.

Opposite Shaft Side Drive Vibration Alarm—If the Opposite Shaft Side Drive Vibration sensor registers a reading that is higher than the value that has been set for the Opposite Shaft Side Drive Vibration Alarm, for the period of time as set for the Opposite Shaft Side Drive Vibration Alarm Delay, an alarm will be generated.

Opposite Shaft Side Drive Vibration Shutdown—If the Opposite Shaft Side Drive Vibration sensor registers a reading that is higher than the value that has been set for the Opposite Shaft Side Drive Vibration Shutdown, for the period of time as set for the Opposite Shaft Side Drive Vibration Shutdown Delay, a shutdown will be generated.

Opposite Shaft Side Drive Temp. Alarm—If the Opposite Shaft Side Drive Temperature sensor registers a reading that is higher than the value that has been set for the Opposite Shaft Side Drive Temperature Alarm, for the period of time as set for the Opposite Shaft Side Drive Temperature Alarm Delay, an alarm will be generated.

Opposite Shaft Side Drive Temp. Shutdown—If the Opposite Shaft Side Drive Temperature sensor registers a reading that is higher than the value that has been set for the Opposite Shaft Side Drive Temperature Shutdown, for the period of time as set for the Opposite Shaft Side Drive Temperature Shutdown Delay, a shutdown will be generated.

Separator Temperature Sensor Fault—This shutdown message is issued if the Oil Separator Temperature reading was out of range for its sensor.

Shaft Side Drive Vibration Alarm—If the Shaft Side Drive Vibration sensor registers a reading that is higher than the value that has been set for the Shaft Side Drive Vibration Alarm, for the period of time as set for the Shaft Side Drive Vibration Alarm Delay, an alarm will be generated.

Shaft Side Drive Vibration Shutdown—If the Shaft Side Drive Vibration sensor registers a reading that is higher than the value that has been set for the Shaft Side Drive Vibration Shutdown, for the period of time as set for the Shaft Side Drive Vibration Shutdown Delay, a shutdown will be generated.

Shaft Side Drive Temp. Alarm—If the Shaft Side Drive Temperature sensor registers a reading that is higher than the value that has been set for the Shaft Side Drive Temperature Alarm, for the period of time as set for the Shaft Side Drive Temperature Alarm Delay, an alarm will be generated.

Shaft Side Drive Temp. Shutdown—If the Shaft Side Drive Temperature sensor registers a reading that is higher than the value that has been set for the Shaft Side Drive Temperature Shutdown, for the period of time as set for the Shaft Side Drive Temperature Shutdown Delay, a shutdown will be generated.

Starting Failure—This message may be issued if Engine or Turbine was enabled, and the start delay period to get to a running condition has expired.

Starting Superheat Shutdown—This message may be issued if Superheat was enabled. A shutdown will occur if the saturated Discharge Pressure plus temperature set point is greater than the Separator temperature.

Suction End Compressor Vibration Alarm—If the Suction End Compressor Vibration sensor registers a reading that is higher than the value that has been set for the Suction End Compressor Vibration Alarm, for the period of time as set for the Suction End Compressor Vibration Alarm Delay, an alarm will be generated.

Suction End Compressor Vibration Shutdown—If the Suction End Compressor Vibration sensor registers a reading that is higher than the value that has been set for the Suction End Compressor Vibration Shutdown, for the period of time as set for the Suction End Compressor Vibration Shutdown Delay, a shutdown will be generated.

Suction Pressure Sensor Fault—This shutdown message is issued if the Suction Pressure reading was out of range for its sensor.

Variable Speed Communications Alarm—If a variable speed option is enabled and the Comms communication has failed, this alarm is shown.

When the Control task detects monitored data falling outside of the preselected range, an alarm event will be created. This event stores the name of the alarm along with the specific time and date the alarm was triggered. In a monitored compressor, for example, at the same time the alarm event occurs, a set of operating values are saved to record the compressor's condition at the time of the alarm. This set of values is preferably defined by the user, and the user-created value set or definition is stored in an Alarm/Shutdown map file. As each alarm or shutdown is triggered, the alarm event and the current operating values are saved to the Alarm/Shutdown history file.

Preferably, there are a plurality of defined system timers, such as 20 ten millisecond timers, 50 one-second timers, and 20 one-minute timers. The Control task is responsible for the maintenance of the timers, but preferably a timer may be set by any task. The timer is set by giving it a value greater than 0. The Control task will then decrease the value of each timer according to its delay type. When the timer reaches 0 it will stop decrementing, and the timer will be inactive.

TASK 2: I/O Communications—The I/O Communications task of FIG. 1 gathers sensor data from CAN bus, analog boards, digital boards, and various Motor Starters/VFDs (variable frequency drive). For example, by using a stored map file having preselected formatting such as particular units of measure and other data display preferences, the sensor data is preferably formatted to degrees C. for Temperature and PASCALS for Pressure. Other sensors for measuring parameters such as amps, compressor speed, and acceleration can be formatted according to their sensor range as it is defined in the map file. The formatted value is entered into its appropriate location in the data file.

TASK 3: External Communications—External communications as shown in FIG. 1 are divided into two functions. The first function is serial communications with connected items such as building equipment, RTU controllers, and PLC controllers, for example. Such serial communications can use RS485, RS422, or RS232 standards. The serial communications task supports basic control (stop, start, load, unload, and status) for MODBUS, Allen-Bradley, and ACSII protocols. The controller can be a slave in a legacy sequence system, but the controller is not the master in sequencing other controllers. The master feature will be performed through the HMI.

The second external communications function, is responsible for sending data to and from the HMI, and is preferably via a provided Ethernet port of the controller. The protocol for sending data files back and forth between the controller and a user communicably connected to the controller by a HMI, is HTTP. The data files sent by the controller provides the HMI with the data it needs to display all the necessary information about the current status of the compressor or other selected monitored equipment. Preferably, there are four file types that can be sent: the complete data file (including historical data), the map files, the alarm history file, and an updated data file (which contains only the modified data values). When the HMI requests the updated data file, the External communications task looks at all updated data values, creates a file, and sends it, but preferably does not store it. The files that are then received back from the HMI are the updated data file and the map files, which include any information changed by the user.

TASK 4: Display and Keypad Functions—The final task of the controller of FIG. 1 handles keypad and display functions of a local HMI directly connected to the controller, such as a local control panel preferably provided in the same housing as the controller. This task preferably allows even the lowest level access user to perform some basic set point adjustments and monitor the controller. More preferably, only the most critical data is displayed on the local HMI connected to the controller, such as pressure and temperature of refrigerant at various compression stages, as well as a few adjustable setpoints associated with those parameters.

Figure 2:
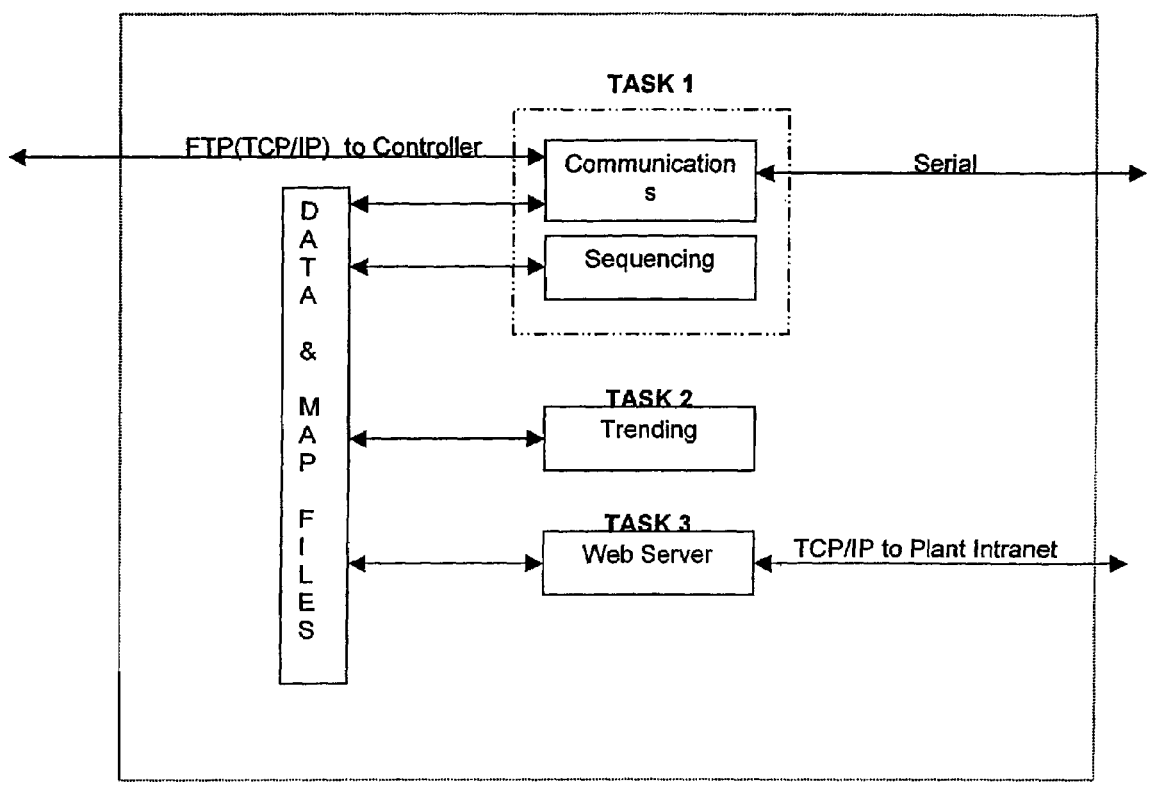
FIG. 2 illustrates a block diagram of an HMI local controller system in accordance with the present invention.
Figure 3:
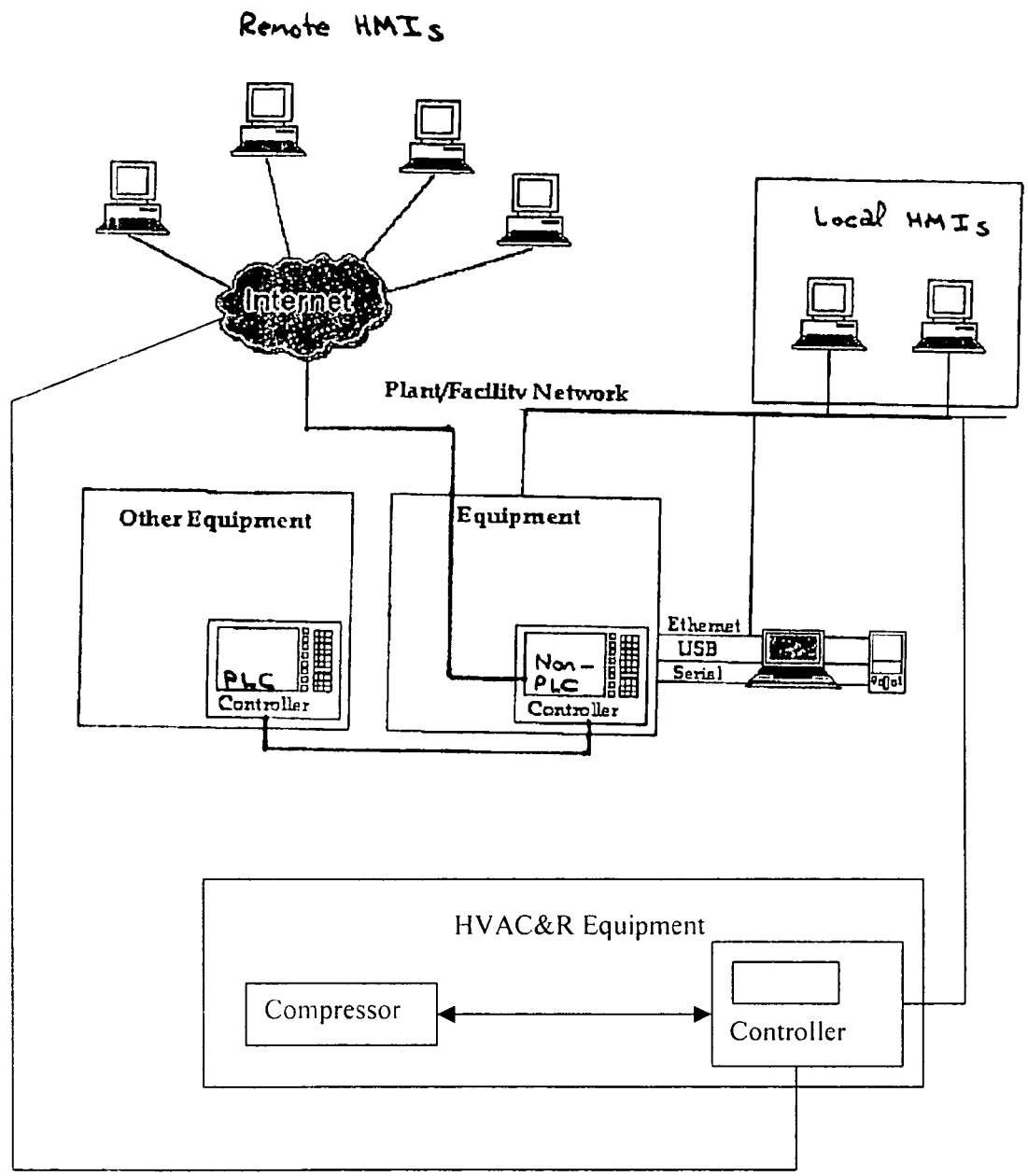
FIG. 3 illustrates a block diagram of a network including a non-PLC with an embedded HTML server, the controller connected to items of building equipment, PLC controllers, and remote and local HMIs.

Human-Machine Interface (HMI)—FIG. 2 illustrates one software layout for a locally connected HMI such as the local control panel previously described. In this embodiment, the HMI not only displays data as a local display, but also acts as a server by distributing the data content to other connections via the Ethernet port. In addition it is able to sequence compressors, deliver data from the controller(s) to computer control systems and distributed control systems, and perform real-time and history trends. These responsibilities are preferably divided into at least four tasks that run independently of one another, but that share the data and map files of the controller.

TASK 1: Communications/Sequencing—The Communications/Sequencing task of FIG. 2 controls the flow of data from the controller to the HMI and from the HMI to the controller. The task maintains the validity of the data by keeping the HMI's data files up-to-date for a real time look and feel. It also sends any new data input by an authorized user back to the controller. For example, when a set point is changed the modified information is sent back to the controller so the controller can update its data file.

When the HMI is first powered on, it communicates with the connected controller and polls for data and map files. After all these files have been retrieved, the Communications/Sequencing task will request the controller's modified data file on a periodic rate that can be preset, or adjusted by a user. When any data value has been changed, either by the user or by an HMI task, the HMI sends its own modified data file back to the controller. The controller in turn updates its own data files. In this way the information in the controller and the HMI are kept in near-real-time sync at all times.

TASK 2: Trending—The Trending task of FIG. 2 gathers data from the controller (or any of various connected controllers) and stores it in the HMI for local viewing as well as for sending trending information to external devices and systems. Trending data is maintained for both real time and history trends. The data for each controller is gathered by a trending map file, which includes the values to be trended. In this way trending can be setup specifically for each controller. All data for trending will be stored as a CSV (comma separated variable) file. This allows users to import the trending data into reporting applications such as computerized spreadsheets. The task is responsible for the reporting of the data to the Web Server task. When a remote Web user requests trending information, the web server passes the specifics of the request to the Trending task. The Trending task then generates the report from the trending data as an HTML file. Finally the Web Server task serves the report to the user.

TASK 3: Web Server—The Web Server task of FIG. 2 is mainly responsible for generating the HTML files that are sent to the browser and/or to the local display as a user interface. There will be a data file that is created for every connection. A connection can be from the keyboard and screen located at the HMI or from a remote PC. Each connection preferably has at least the following four parameters: language, pressure units, temperature units, and security level. This means that potentially a compressor in China could be viewed at the same time by the local user in China, by a person in Denmark, and by another person in the US. While the local user in China is reading the data in Chinese, the individual in Denmark could see the information in Danish, Bar, and ° C. and the person in the US could view the same data in English, PSIG, and ° F. The sever task takes the information in the data file and the map files and by looking at the connection parameters generates an HTML file to be displayed for that specific user. When a set point change is attempted the range is checked against the map file, and the user is informed that the input was invalid.

The system and methods of the present invention provide for controlled access by users to avoid unauthorized receipt, review, and editing of data, as well as unauthorized adjustment of operating parameters of controlled equipment. Controlled access includes the authorization of users, such as through user lists, as well as the assignment of secure network identification numbers. Authorized user or "buddy" lists, passwords, and other common secure access features provided by known software and services can be used to provide additional security. For example, software may include a protocol for controlling the addition and deletion of users, as well as authenticating users. In a preferred embodiment, each controller and each authorized user has a unique identification, and each item of building equipment and/or controller has a secure address on a wide area network. The identifications can be included in user lists created for authorized users and stored in the controller or a component communicably connected to a controller. Preferably, access to each controller is password protected. In this embodiment, whenever the web server is accessed by a user, the controller verifies the ID and password provided by the requesting user against a stored list of authorized identification numbers and passwords. Once verified, the server allows access to data from the connected building equipment.

Preferably, there are multiple levels of security provided. In the preferred embodiment, users assigned a particular level of security are not able to see the information that is inappropriate for that level. More preferably, no data is grayed out or in any way appear to be inaccessible—if the user cannot change it they cannot see it. In one embodiment, five levels of user access security are provided as follows: 1) Programming; 2) Factory; 3) Service; 4) High level user; 5) General user.

In the preferred embodiment of an HTML-driven embedded, non-PLC, controller system for the monitoring of equipment, the equipment is a compressor of an HVAC&R system. The system can be monitored by a local user using a local computer interface, which preferably is in close physical proximity to the equipment, and by a remotely located user using a remotely located interface. The HVAC&R building equipment is communicably linked to a controller having an embedded web server that is communicably linked to a wide area network such as the Internet to permit electronic signals and data from the building equipment to be sent to a web page generated by the web server. The controller includes a microprocessor and code (software) executable by the microprocessor for data gathering, data conversion and formatting data from the connected building equipment.

In the preferred embodiment of the system, the web server of the controller is also communicably connected to a local data network, preferably an Ethernet hub. The local data network may include a local server, a local user interface device such as a PC, laptop, PDA, or other computerized communication device, and a gateway (that may be protected by a firewall) for connection to a wide area network such as the Internet. The gateway is preferably the same gateway incorporated in the controller and is controlled by software residing on and executed by a microprocessor of the controller. The wide area network is preferably the Internet, but can be any suitable computer network.

Preferably, the web server of the controller includes a gateway for direct connection to the wide area network, obviating the need for a gateway in any connected BAS or local area network. Local and remote users access the website through a user interface device such as a PC, laptop, PDA, or other computerized communication device that can access the wide area network. The gateway of the embedded web server of the controller is preferably firewall protected. The web server thus enables Internet-based communication between a remote user (or local user) and the controller.

The web server and controller act together to control the access of local and remotely located users to data gathered from each unit of building equipment connected to the controller. The controller can preferably simultaneously connect to multiple items of building equipment, it being understood that the number of equipment devices supported by controller depends on configuration of the controller.

Other system controllers includes a microprocessor executing software to scan or poll the connected equipment to gather equipment information. In the case of heating, ventilation, air conditioning, and refrigeration (HVAC&R) building equipment, the equipment information can include alarms and faults, operational status (such as on, off, standby), mode and settings (cooling, heating, fan only, selected temperature), operational parameters (such as compressor speed, fan speed, thermostat setting, refrigerant level, temperature and pressure), and historical parameters (run time, downtime, maintenance), and other data relevant to the connected equipment. Preferably, the scanning or polling is automatically performed by the controller at least once every five seconds. However, the intervals of time between polling may be selected or altered by users, system administrators, or other authorized personnel to a desired or appropriate time period.

Depending upon the type of building equipment, data from the building equipment may require conversion or formatting to make it suitable for display. Preferably, the microprocessor of the controller executes all necessary data conversion and/or formatting to enable transmission and display of gathered data.

The invention further provides for methods of monitoring and controlling building equipment using the HTML-driven embedded controller. The controller automatically polls the connected building equipment at preselected intervals and gathers alarms, faults, and other preselected status data. More preferably, the controller automatically polls only for analog and digital status data such as faults and alarms. In the next step, the gathered data is incorporated into CGI scripts by the microprocessor of the controller. In the next step, the CGI scripts populate tags provided in an HTML web page served by the web server. In the next step, remote users log on to the web server using a remote interface, and enter their user name and password. In the next step, the software of the microprocessor of the controller recognizes the user name and password and associates it with a stored user profile that includes an access level for the recognized user. In the next step, the server sends data to the remote user's interface that corresponds with the user's access level, along with computerized instructions executable by the remote device for generating a display having the display characteristics in the user's stored user profile. In the next step, the remote user's interface displays the data, preferably in numeric, tabular, and graphic display formats.

Notably, the features of the described embodiments of the methods of the present invention can be combined to permit automatic notification of alarms, faults, shutdowns, and other critical operating parameters of the building equipment to logged-on users, while also allowing remote users to select, request, and obtain data concerning specific operating parameters of particular items of building equipment.

The invention may further include features to conserve controller memory. For example, data gathered by the controller for connected equipment can be overwritten when the equipment is next polled. Alternatively, data may be automatically retained by a controller or connected system component having storage capacity for a preselected period of time or up to a preselected number files. Preferably, the preselected period of time to retain data and/or the preselected number of stored data files, can be adjusted by system administrators, local users, and remote users having an appropriate access level. Lastly, data retrieved by a remote user can be automatically deleted from any or all of the components of the system when the next CGI script is transmitted to populate the HTML web page.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for remotely monitoring building equipment, the system comprising:
   at least one item of building equipment;
   a non-PLC controller communicably connected to the at least one item of building equipment to receive data from the building equipment, the non-PLC controller having a web server, a microprocessor and a memory storing a computer program executable by the microprocessor, the computer program comprising computer instructions to:
   gather data from the connected building equipment;
   capture the data in CGI scripts;
   populate the data into tags provided in an HTML web page generated by the web server of the non-PLC controller;
   permit a user to log on to the web server using an HMI device;
   prompt the user to enter a user name and password;
   recognize the user name and password and associate the user name and password with a stored user profile having an access level for the recognized user; and
   send data using the web server to the user;
   wherein, the data sent to the user corresponds with the access level and includes instructions to generate a display for the user having predetermined display characteristics associated with the stored user profile.

2. The system of claim 1, wherein the building equipment is selected from the group consisting of heating, ventilation, air conditioning, and refrigeration equipment.

3. The system of claim 1, wherein the data is selected from the group consisting of alarms and faults, operational status, mode, settings, operating parameters, historical parameters, and combinations thereof.

4. The system of claim 3, wherein the operating parameter is selected from the group consisting of: compressor speed, fan speed, thermostat setting, refrigerant level, temperature, pressure, compressor capacity, motor amps, and combinations thereof.

5. The system of claim 3, wherein the building equipment is a compressor of an HVAC&R system, and wherein the operating parameter is selected from the group consisting of: capacity slide position, volume slide position, suction pressure, discharge pressure, oil pressure, main oil injection pressure, economizer pressure, filter pressure, intermediate pressure at an intermediate stage of compression, balance piston pressure, system discharge pressure, suction temperature, discharge temperature, oil temperature of the compressor, oil separator temperature, process/brine temperature leaving, process/brine temperature entering, motor current, motor amps, motor and compressor speed, compressor vibration during suction, compressor vibration during discharge, motor vibration at a shaft side, motor vibration at an opposite shaft side, and combinations thereof.

6. The system of claim 3, wherein the historical parameters are selected from the group consisting of: run time, downtime, and maintenance.

7. The system of claim 1, wherein date gathering from the building equipment is performed automatically at predetermined intervals selected by a user.

8. The system of claim 1, wherein the gathered data is automatically retained for a preselected period of time or up to a preselected number files by a system component having data storage capacity.

9. The system of claim 8, wherein the preselected period of time can be adjusted by a user.

10. The system of claim 8, wherein the gathered data is automatically deleted when another CGI script is transmitted to populate the HTML web page.

11. A system for remotely monitoring building equipment, the system comprising:
at least one item of building equipment;
a non-PLC controller communicably connected to the at least one item of building equipment to receive data from the building equipment, the non-PLC controller having a web server, a microprocessor and a memory storing a computer program executable by the microprocessor, the computer program comprising computer instructions to:
gather data from the connected building equipment;
capture the data in CGI scripts;
populate the data into tags provided in an HTML web page generated by the web server of the non-PLC controller;
permit a user to log on to the web server using a human-machine interface (HMI) device;
prompt the user to enter a user name and password;
recognize the user name and password and associate the user name and password with a stored user profile having an access level for the recognized user; and
send data using the web server to the user, wherein the data sent to the user corresponds with the access level and includes instructions to display the HTML web page using predetermined display characteristics associated with the stored user profile, wherein the data further includes computerized instructions executable by the HMI device for allowing the user to manipulate the sent data, and to return the user-manipulated data to the controller to modify an operating parameter of the building equipment; and
at least one HMI in communicable connection with the web server to receive the HTML web page.

12. A method of monitoring and controlling building equipment, the method comprising the steps of: providing a system for remotely monitoring building equipment, the system comprising: at least one item of building equipment, a non-PLC controller communicably connected to the at least one item of building equipment to receive data from the building equipment, the non-PLC controller having a web server, a microprocessor and a memory storing a computer program executable by the microprocessor; automatically polling the connected building equipment at preselected intervals using the non-PLC controller; gathering data from the connected building equipment; incorporating the gathered data into CGI scripts using the microprocessor of the controller; and populating tags with the CGI scripts, the tags being provided in an HTML web page generated by the web sewer of the controller.

13. The method of claim 12, farther comprised of the steps of: providing a remote interface device for use by a remote user; permitting the remote user to access the web server using the remote interface device; prompting the user to enter a user name and password; recognizing the user name and password and associating the user name and password with a stored user profile with an access level for the user; sending data to the remote interface using the web server, the sent data corresponding with the access level of the user, the sent data further including instructions executable by the remote interface device for generating a display having predetermined display characteristics associated with the stored user profile; displaying the sent data on the remote interface device.

14. The method of claim 12, wherein the step of gathering data includes gathering data relating to operating parameters of connected building equipment, and wherein the method further includes the steps of: comparing the gathered data to a predetermined stored range for an operating parameter; and automatically generating an electronic event if the gathered data falls outside of the predetermined stored range for an operating parameter.

15. The method of claim 14, wherein the electronic event includes a notification that is automatically provided to the web server.

16. The method of claim 14, wherein the electronic event further includes an electronic command that is generated by the controller and sent back to the connected equipment, the electronic command selected from the group consisting of a command to shutdown the connected building equipment, and a command to modify the operation of the connected building equipment.

17. The method of claim 14, wherein the step of automatically generating an electronic event includes automatically notifying all logged-on users having a predetermined user profile.

18. The method of claim 12, further comprised of the step of allowing remote users to select, request, obtain, and manipulate data concerning an operating parameter of the connected building equipment.

19. The method of claim 12, wherein the connected building equipment is a compressor of an HVAC&R system, and wherein the operating parameter is selected from the group consisting of: capacity slide position, volume slide position, suction pressure, discharge pressure, oil pressure, main oil injection pressure, economizer pressure, filter pressure, intermediate pressure at an intermediate stage of compression, balance piston pressure, system discharge pressure, suction temperature, discharge temperature, oil temperature of the compressor, oil separator temperature, process/brine temperature leaving, process/brine temperature entering, motor current, motor amps, motor and compressor speed, compressor vibration during suction, compressor vibration during discharge, motor vibration at a shaft side, motor vibration at an opposite shaft side, and combinations thereof.

20. The method of claim 17, wherein the electronic event is selected from the group consisting of: analog board communication failure shutdown, analog board failure shutdown, auxiliary alarm, auxiliary shutdown, balance piston failure shutdown, compressor auxiliary failure, compressor interlock failure, compressor starting failure auxiliary, compressor starting failure for low motor amps, compressor stopping failure auxiliary, compressor stopping failure for motor amps, compressor unable to unload alarm, dbs alarm, dbs trip, digital board reset, digital board shutdown, digital board communication failure shutdown, discharge end compressor vibration alarm, discharge end compressor vibration shutdown, discharge pressure sensor fault, discharge temperature saturation alarm, discharge temperature saturation shutdown, discharge temperature sensor fault, false start failure auxiliary, false start failure for motor amps, high auxiliary analog alarm, high discharge temperature alarm, high discharge temperature shutdown, high discharge pressure alarm, high discharge pressure shutdown, high economizer alarm, high economizer shutdown, high entering process temperature alarm, high entering process temperature shutdown, high liquid level shutdown, high manifold pressure alarm, high manifold pressure shutdown, high motor current alarm, high motor current shutdown, high oil filter pressure alarm, high oil filter pressure shutdown, high oil temperature alarm, high oil temperature shutdown, high rpm alarm, high rpm shut down, high suction pressure alarm, high suction pressure shutdown, insufficient main oil pressure shutdown, liquid slug alarm, liquid slug shutdown, low auxiliary analog alarm, low auxiliary analog shutdown, low economizer alarm, low economizer shutdown, low entering process temperature alarm, low entering process temperature shutdown, low main oil injection pressure shutdown, low motor current shutdown, low oil pressure alarm, low oil pressure shutdown, low oil separator temperature alarm, low oil separator temperature shutdown, low oil temperature alarm, low oil temperature shutdown, low process temperature alarm, low process temperature shutdown, low rpm alarm, low rpm shutdown, low suction pressure alarm, low suction pressure shutdown, maintenance alarm, missing oil pressure alarm, missing oil pressure shutdown, motor stator temperature alarm, motor stator shutdown alarm, motor starter communication failure shutdown, oil level shutdown, oil log shutdown, oil pressure sensor fault, oil pump aux failure, oil pump alarm, oil pump failure shutdown, oil temperature sensor fault, opposite shaft side drive vibration alarm, opposite shaft side drive vibration shutdown, opposite shaft side drive temperature alarm, opposite shaft side drive temperature shutdown, separator temperature sensor fault, shaft side drive vibration alarm, shaft side drive vibration shutdown, shaft side drive temperature alarm, shaft side drive temperature shutdown, staffing failure, staffing superheat shutdown, suction end compressor vibration alarm, suction end compressor vibration shutdown, suction pressure sensor fault, and variable speed communications alarm.

\* \* \* \* \*

UNITED STATES PATENT AND TRADEMARK OFFICE
CERTIFICATE OF CORRECTION

PATENT NO. : 7,440,809 B2
APPLICATION NO. : 11/179315
DATED : October 21, 2008
INVENTOR(S) : Lehman et al.

It is certified that error appears in the above-identified patent and that said Letters Patent is hereby corrected as shown below:

Column 20, Line 18, "sewer of" should read --server of--
Column 20, Line 19, "farther comprised" should read --further comprised--
Column 22, Line 26, "staffing failure, staffing" should read --starting failure, starting--

Signed and Sealed this

Twenty-fifth Day of May, 2010

David J. Kappos
*Director of the United States Patent and Trademark Office*